May 5, 1953  R. G. PIETY  2,637,839
ROTATIONAL SEISMOMETER
Filed April 20, 1948  2 SHEETS—SHEET 1

INVENTOR.
R.G. PIETY
BY Hudson & Young
ATTORNEYS

May 5, 1953  R. G. PIETY  2,637,839
ROTATIONAL SEISMOMETER
Filed April 20, 1948  2 SHEETS—SHEET 2

INVENTOR.
R.G. PIETY
BY Hudson & Young
ATTORNEYS

Patented May 5, 1953

2,637,839

UNITED STATES PATENT OFFICE 2,637,839

ROTATIONAL SEISMOMETER

Raymond G. Piety, Bartlesville, Okla., assignor to Phillips Petroleum Company, a corporation of Delaware Application April 20, 1948, Serial No. 22,191

10 Claims. (Cl. 340—17)

This invention relates to rotational seismometers for producing electrical currents representative of rotational movement of the earth due to either the rotational component of the surface waves or the shear component of a general disturbance.

In the art of geophical prospecting, an explosive charge is detonated at a location referred to as the "shot point," the resulting explosion causing seismic waves to be propagated through the earth. At a position remote from the shot point, the seismic waves are converted into electrical currents representative thereof by an electromechanical transducer or seismometer and these electrical currents are amplified and recorded, the resulting record yielding valuable information as to the nature and configuration of subterranean strata. In the usual geophysical prospecting system, the seismometers are responsive to all vertical movements of the earth, some of which are caused by seismic waves which penetrate the earth and are reflected from the subterranean strata, these reflected waves yielding the data which are of interest to the geophysicist. However, certain of the seismic waves, which are often referred to as Rayleigh waves or ground roll, are propagated along the surface of the earth and the vertical motion of the seismometer resulting from these ground waves makes it difficult to observe the reflected or refracted waves from the subsurface.

In my copending application, Serial No. 49,081, filed September 13, 1948, now abandoned, I have disclosed a method for eliminating the effect of ground roll by combining the output of a rotational type seismometer with the output of an ordinary translational seismometer. The rotational seismometer is responsive to the rocking movement of the earth due to ground roll and is not affected by reflected waves, provided that it is properly oriented with respect to the shot point. As pointed out in the copending application, the output of a rotational seismometer may be electrically altered so as to provide an electrical current which will neutralize the effects of the translational or vertical component of ground roll when mixed with the electrical output of an ordinary seismometer.

I have found that rotational seismometers previously known are not sufficiently sensitive and accurate to provide reliable results when used in the system described by my previously mentioned copending application. Difficulties are encountered in the use of such seismometers in that the output is affected by the reflected waves and uniform results are not obtained when ground waves of equal amplitude are caused to actuate the seismometer.

It is an object of this invention to provide a rotational seismometer which is highly sensitive and which accurately responds to movement of the earth resulting from ground roll.

It is a further object of the invention to provide a rotational seismometer which is not affected by vertical movement of the earth due to reflected seismic waves.

It is a still further object of the invention to provide a rotational seismometer which is rugged in construction, reliable in operation, has a minimum of moving parts, and is economical to manufacture.

Various other objects, advantages and features of the invention will become apparent from the following detailed description taken in conjunction with the accompanying drawings, in which.

Figure 1:
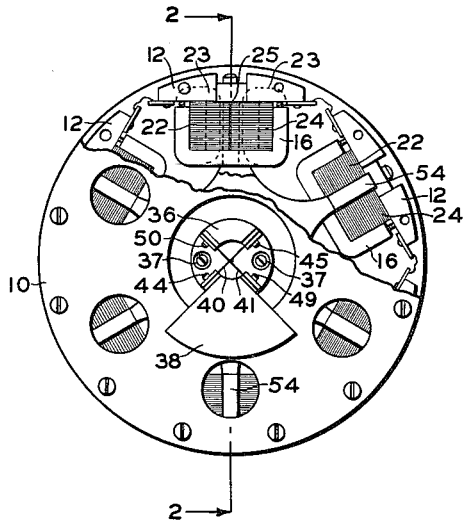
Figure 1 is a top plan view of a rotational seismometer constructed in accordance with this invention with a portion of the cover and rotor broken away to show the interior construction.

Referring now to the drawings in detail and particularly to Figures 1 to 5, the rotational seismometer may include a casing defined by spaced, non-magnetic end plates 10, 11 and a plurality of flat coil unit supports 12 which are mounted between the peripheral portions of end plates 10, 11 by screws 13, the supports 12 thereby constituting a cylindrical portion of the casing and being symmetrically disposed with respect to the axis of the casing.

Figure 5:
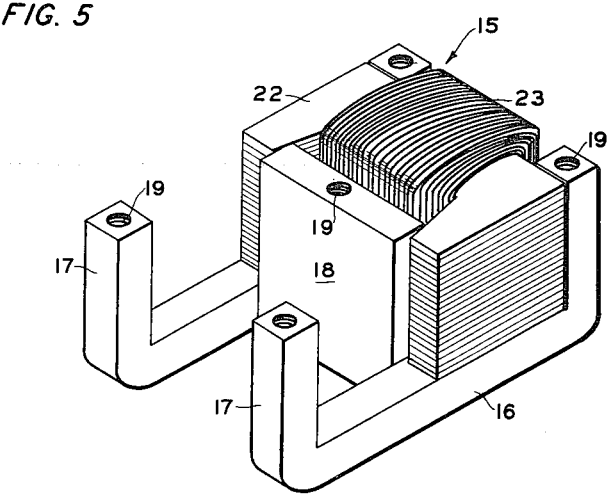
Figure 5 is an enlarged perspective veiw of a coil unit.

Each support 12 carries a coil unit 15, Figure 5, which comprises a spider 16 of non-magnetic material having two spaced generally U-shaped frame members 17 joined by a central plate 18. The plate 18 and each leg of the frame members 17 is tapped, as indicated at 19, to receive screws 20, Figure 4, which mount each spider upon its associated coil support 12. The spider carries a pair of generally U-shaped laminated cores, one of which is shown at 22 in Figure 5. A coil 23 is wound around the body of each core 22 and the cores are formed of a suitable ferromagnetic material so that changes in the magnetic flux density of the core induce electrical currents in the coil.

The tapered legs of the core 22 are supported by the respective frame members 16, the ends of the core extending to the middle of the plate 18. In assembling the unit, a similar core 24, Figure 1, is disposed on the opposite side of spider 16 and the legs of this second core are very closely spaced to the legs of the first core 22. Accordingly, a very small gap 25, Figure 1, is formed between the cores, this gap having a width of about .001 inch. Such a gap may be readily obtained by coating the abutting faces of the cores 22, 24 with an insulating varnish and then assembling both cores tightly into the spider 16. In this manner, the insulating varnish provides the desired spacing so long as abnormally high pressures are not used in assembling the cores into the spider.

A coil unit similar to that described in connection with Figure 5 is provided for each of the supports 12 and these coil units are symmetrically disposed with respect to the axis of the casing.

Figure 2:
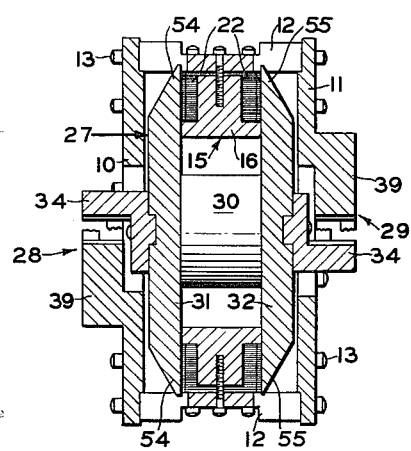
Figure 2 is a sectional view taken along the line 2—2 of Figure 1.
Figure 3:
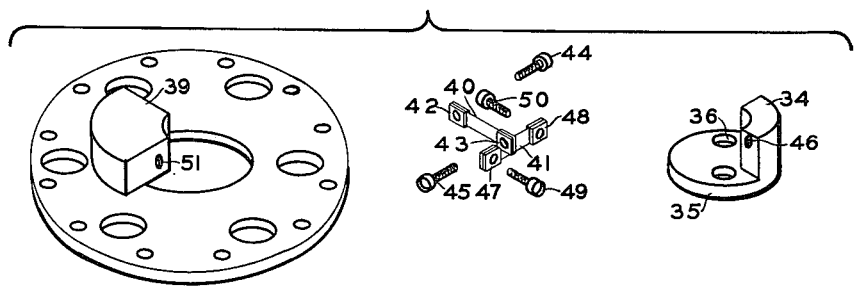
Figure 3 is a perspective view of a spring suspension with the parts in disassembled relation.
Figure 4:
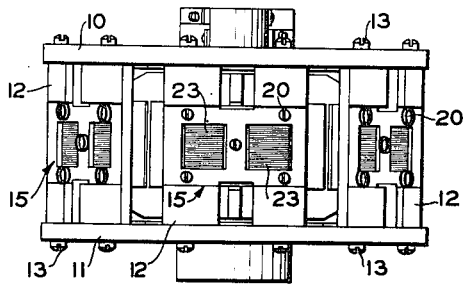
Figure 4 is a front elevational view of the seismometer shown by Figure 1.

Cooperating with the coil units 15 is a suspended element 27, Figure 2, which is secured to the casing by identical spring suspension units 28 and 29. The suspended element comprises a cylindrical permanent magnet 30 having ferromagnetic end sections 31, 32 secured thereto in any suitable manner, end section 31 being secured to end plate 10 by spring suspension 28 and end section 32 being secured to end plate 11 by spring suspension 29. Each spring suspension includes a block 34 integrally formed with a disc member 35 and each disc has openings 36 formed therein for receiving screws 37, Figure 1, by which the disc and block are attached to the associated end section 31 or 32. Each of the end plates 10, 11 carries a block 39 and each set of blocks 34, 39 is connected together by elongated resilient flexure hinges 40 and 41. Resilient hinge 40 has two plates 42 and 43, Figure 3, secured to the respective ends thereof and these plates are drilled to receive screws 44 and 45, screw 45 extending through plate 43 and being received in a threaded bore 46 in block 34, and screw 44 passing through plate 42 into a threaded bore, not shown, in block 39. Similarly, the resilient hinge 41 has two end plates 47, 48 which are drilled to receive screws 49 and 50, screw 49 passing through plate 47 and extending into a tapped opening 51 in block 39 while screw 50 extends through plate 48 into a tapped opening, not shown, in block 34.

When assembled, it will be apparent that the hinges 40, 41 are at right angles to each other and that said hinges lie in planes defined by the axis of the suspended element 27. The suspensions 28 and 29 are identical in construction but suspension 29 is rotated 180 degrees with respect to suspension 28. These resilient hinges are very efficient in eliminating translational movement of the suspended element. Thus, although the suspended element is free to rotate relative to the casing, the suspensions 28, 29 prevent either axial or transverse displacement thereof with respect to the casing. In addition, the suspensions 28, 29 bias the suspended element to a predetermined angular position with respect to the casing.

The suspended element plates 31, 32 are of ferromagnetic material and these plates are shaped to form a plurality of sets 54, 55 of axially spaced radially extending fingers. The fingers of each set are in vertical alignment, Figure 2, and the peripheral portions of each set of fingers are positioned in vertical alignment with one of the gaps 25 when the suspended element is in the predetermined angular position to which it is biased by spring suspensions 28 and 29. The spacing between the fingers of each set is such that the peripheral portions of the fingers are spaced about .001 inch from the adjacent surfaces of the laminated cores 22 and 24. Accordingly, it will be apparent that the permanent magnet 30, each set of fingers 54 and 55, and the cores 22, 24 associated therewith, form a complete magnetic circuit and that the coils 23 of each unit are positioned in the magnetic field established by such circuit.

The operation of the described rotational seismometer will now be apparent to those skilled in the art. Assuming that the axis of the rotational seismometer is positioned parallel to the earth and perpendicular to a line connecting the shot point and the rotational seismometer, ground roll propagated from the shot point to the seismometer causes the seismometer casing to rotate with respect to the suspended element, which is maintained in a stationary position due to inertia. As a result, relative rotational movement occurs between each of the coil units 15 and the fingers 54, 55 associated therewith with the result that the flux linkages between said fingers and their respective cores 22, 24 are changed.

Assuming that the coil units 16 of Figure 1 move in a counterclockwise direction with respect to the associated fingers 54 and 55, the flux linkage between the fingers and each core 24 is increased while the flux linkage between the fingers and each core 22 is decreased. As a result, a voltage proportional to the velocity of the rotational movement is induced in the coil wound on each core 24 while a voltage of similar magnitude but of opposite polarity is induced in the coil wound on each core 22. If these coils are connected in series aiding relationship, the induced currents are additive and the induced voltage is proportional to the velocity of angular movement which, in turn, is proportional to the rotational component of the ground waves incident upon the seismometer. If the dual coil units are all connected in parallel, a relatively large current is produced and the voltage, although lower, is still proportional to the velocity of rotational movement produced by the seismic waves.

A similar effect results when the coil units are rotated in a clockwise direction with respect to the suspended element by the seismic wave. In this case, the induced voltage is also proportional to the velocity of rotation but said voltage is of opposite polarity since the flux linkage between the fingers 54, 55 and each core 22 is increased while the flux linkage between fingers 54, 55 and each core 24 is decreased. Thus, the effect of the clockwise movement on the magnetic fields established in the cores 22, 24 is opposite to that produced by counterclockwise movement.

The use of a plurality of coil units makes the seismometer very sensitive to rotational earth movements and this sensitivity is increased by the use of the radially extending fingers 54 and 55. This results from the fact that the ends of the fingers move further, for a predetermined rotational movement, than the inner portions of the suspended element. The symmetrical arrangement of the fingers balances out or dampens the toggle force created by the magnetic laminated cores of the respective coil units and the flexure plate hinges result in still further stability by eliminating translational movement of the suspended element.

Figure 6:
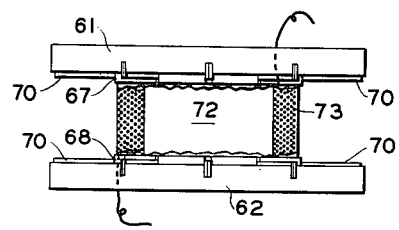
Figure 6 is a front elevational view of a modified rotor construction.
Figure 7:
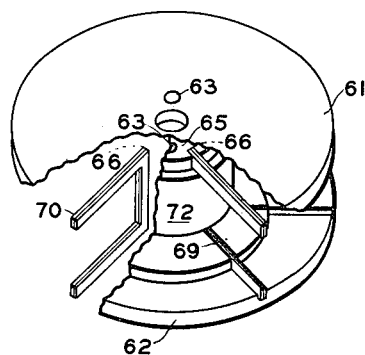
Figure 7 is a perspective view of the rotor shown by Figure 6 with a portion of the cover broken away to show the interior construction.

Referring now to Figures 6 and 7, I have shown a modified suspended element structure for producing an electrical current in the coil units which is proportional to the angular displacement of the casing with respect to the suspended element, rather than the velocity with which the displacement occurs. The casing and coil units in the modified form of the invention are identical with those already described but the suspended element construction is changed so that an alternating magnetic field is applied to the cores 22 rather than a unidirectional field, as in the seismometer of Figures 1 to 5. The modified suspended element construction includes top and bottom plates 61, 62 which are provided with tapped openings 63 for receiving screws to support the spring suspension blocks 38 of Figure 1. These plates are formed from a suitable insulating material, such as Bakelite, and they are spaced by an inner cylindrical core 65 which is also formed from insulating material and which is provided with axial peripheral grooves 66. A pair of inner plate members 67, 68 are suitably secured to the respective inner surfaces of the plates 61, 62 and each of these inner plates is provided with radial grooves, as indicated at 69, which register with the respective longitudinal grooves 66 in core member 65.

Each set of grooves 66, 69 carries a generally U-shaped laminated member 70 which is formed by stacking together a plurality of U-shaped laminations and interposing thin paper sheets between adjacent laminations, the structure being held together by a suitable flake shellac. The laminated members 70 are formed of paramagnetic material and the legs of each member constitute fingers corresponding to the fingers 54, 55 of Figure 2. These fingers are adapted to be positioned closely adjacent the air gaps 25 in the respective coil units in the same manner as the fingers 54, 55 of Figure 2.

The U-shaped members 70 are held within the groves 69 by an insulating sleeve 72 which engages the base portion of each of said members. A coil 73 is wound upon the sleeve 72 and the terminals of this coil extend through openings in the top plates 61 and 62, respectively, for connection to a suitable source of alternating current, not shown.

When the suspended element described in connection with Figures 6 and 7 is substituted for the suspended element 27 of Figures 1 to 5, and an alternating current is applied to coil 73, an alternating magnetic field is established by the coil in each of the U-shaped members 70 and the cores 22, 24 associated therewith, this field inducing a corresponding electric current in the associated coils 23. When the fingers 70 are positioned directly over the respective air gaps 25, the current induced in the two coils 23 of each coil unit 15 is equal and of opposite polarity so that no current is produced by the seismometer unit. Preferably and advantageously, this is the position to which the suspended element is biased by action of the spring suspensions 28 and 29.

Assuming that an angular displacement of the casing relative to the suspended element occurs, for example, in a counterclockwise direction, Figure 1, the flux linkage between the members 70 and the respective cores 24 is increased while the flux linkage between the fingers and the respective cores 22 is decreased. Accordingly, an alternating current is induced in the coils 23, the induced voltage being proportional to the displacement of the casing from the predetermined angular position wherein the fingers are positioned directly over the air gaps 25. If the casing is moved in a clockwise direction, Figure 2, relative to the suspended element, a voltage is produced which is proportional to the displacement of the casing but this voltage is of opposite polarity with respect to that produced by counterclockwise displacement of the casing. Accordingly, when the modified suspended element construction is utilized, a voltage is induced in the coils 23 by the magnetic field produced by coil 73 and this induced voltage is proportional to the displacement of the casing. When the seismometer is positioned with its axis horizontal to the ground and perpendicular to a line connecting the shot point and the seismometer station, the modified rotational seismometer indicates the angular displacement of the earth caused by ground roll or seismic shear waves.

It will be apparent that I have attained the objects of my invention in providing a rotational seismometer which is extremely sensitive and which is capable of measuring minute rotational movements of the earth due to ground roll or seismic shear waves. The increased sensitivity is due to the use of a large number of symmetrically disposed coil units, either the current or voltage of which may be added so that very small earth movements are readily indicated by the seismometer. Increased sensitivity is also obtained by the use of the peripheral ends of the suspended element fingers to change the flux of the respective coil units and by the use of flexure hinges 28, 29 to prevent translational movement of the suspended element, with the result that the seismometer is not sensitive to vertical or horizontal ground movements, but only to rotational movements resulting from ground roll.

While the invention has been described in connection with a present, preferred embodiment thereof, it is to be understood that this description is illustrative only and is not intended to limit the invention, the scope of which is defined by the appended claims.

Having described my invention, I claim:

1. A rotational seismometer comprising, in combination, a casing, a paramagnetic core mounted on said casing, a coil wound thereon, a suspended element, resilient means suspending said element for relative rotational movement with respect to said casing and biasing said element to a predetermined angular position, a pair of axially spaced radially extending paramagnetic fingers forming a part of said element and having their peripheral end portions closely spaced to and embracing said core, and means for establishing a magnetic flux linkage between said fingers and said core whereby relative angular movement between said casing and said element causes a change in said flux linkage thereby producing an electric current in said coil which is respresentative of said angular movement.

2. A rotational seismometer comprising, in combination, a generally cylindrical casing, a plurality of coil units spaced circumferentially about said casing, each unit including a paramagnetic core having a coil wound thereon, a suspended element, resilient means suspending said element for relative rotational movement with respect to said casing and biasing said element to a predetermined angular position, said resilient means also preventing axial or transverse displacement of said element with respect to said casing, a set of axially spaced paramagnetic fingers cooperating with each coil unit, the fingers of each set extending radially from said element and having their outer portions closely adjacent and embracing opposite ends of one of said cores, means for establishing a magnetic flux linkage between each set of fingers and the associated core whereby relative angular movement between said element and said casing causes a change in said flux linkage thereby producing an electric current in said coil which is representative of said angular movement.

3. A rotational seismometer comprising, in combination, a casing having a generally cylindrical portion, a plurality of coil units spaced circumferentially around said cylindrical portion and occupying substantially all the space within the outer region of the casing, each unit including a laminated core having a coil wound thereon, a suspended element, a spring suspension mounting said element at the center of said cylindrical portion and biasing it to a predetermined angular position, means on said element for establishing a magnetic circuit with each laminated core including a set of axially spaced fingers extending radially from said armature to the respective ends of each core, the outer ends of each set of fingers embracing the core associated therewith and means on said element for completing a magnetic circuit between the inner ends of each set of fingers whereby relative angular movement between said element and said casing causes a change in the flux linkage between the outer ends of each set of fingers and the associated core thereby producing an electric current in each coil which is representative of said angular movement.

4. A rotational seismometer comprising, in combination, a casing having a generally cylindrical portion, a set of coil units spaced circumferentially about said cylindrical portion, each unit including a spider of non-magnetic material secured to said casing, a pair of generally U-shaped laminated cores supported by said spider and having their ends in closely spaced relation defining a small gap therebetween, and a coil wound upon each of said laminated cores, a suspended element, a spring suspension mounting said element at the center of said cylindrical portion and biasing it to a predetermined angular position, means on said element for establishing a magnetic circuit with the core of each coil unit including a set of axially spaced fingers extending radially from said element to the respective ends of each gap when said element is in said predetermined angular position, and magnetic means disposed axially of said element for completing a magnetic circuit between the inner ends of each set of fingers whereby relative angular movement between said element and said casing causes a change in the flux linkage between the outer ends of each set of fingers and the associated core thereby producing an electric current in said coil which is representative of said angular movement.

5. A rotational seismometer comprising, in combination, a casing, a core mounted on said casing, a coil wound thereon, a suspended element, resilient means suspending said element for relative rotational movement with respect to said casing and biasing said element to a predetermined angular position, a pair of axially spaced radially extending paramagnetic fingers forming a part of said element and having their peripheral end portions closely adjacent and embracing opposite ends of said core, and a permanent magnet mounted on said element between said fingers for establishing a magnetic flux linkage between said fingers and said core, whereby relative angular movement between said element and said casing causes a change in said flux linkage thereby to induce an electric current in said coil which is proportional to the velocity of said angular movement.

6. A rotational seismometer comprising, in combination, a generally cylindrical casing, a plurality of coil units spaced circumferentially about said casing, each unit including a pair of opposed, generally U-shaped laminations having an air gap therebetween with a coil wound on each lamination, a suspended element, a spring suspension including two sets of flexure plate hinges mounted on said casing for supporting said elements, biasing it to a predetermined angular position and preventing axial or transverse displacement thereof with respect to said casing, a set of paramagnetic fingers cooperating with each coil unit, the fingers of each set extending radially from said element and having their outer end portions closely adjacent the air gap of the coil unit associated therewith, a permanent magnet forming a part of said element for establishing a magnetic flux linkage between each set of fingers and the laminations associated therewith whereby relative angular movement between said element and said casing changes said flux linkage thereby producing an electric current in each coil which is proportional to the velocity of said angular movement.

7. A rotational seismometer comprising, in combination, a casing having a generally cylindrical portion, a set of coil units spaced circumferentially about said cylindrical portion, each unit including a spider of non-magnetic material secured to said casing, a pair of generally U-shaped laminated cores supported by said spider and having their ends in closely spaced relation defining a small gap therebetween, and a coil wound upon each of said laminated cores, a suspended element, a spring suspension mounting said element at the center of said cylindrical portion and biasing it to a predetermined angular position, means on said element for establishing a magnetic circuit with the core of each coil unit including a set of spaced fingers extending radially from said element to the respective ends of each gap, and a cylindrical permanent magnet disposed axially of said element for completing a magnetic circuit between the inner ends of each set of fingers whereby angular movement of said element causes a change in the flux linkage between the outer ends of each set of fingers and the associated core thereby producing an electric current in said coil which is representative of the velocity of said angular movement.

8. A rotational seismometer comprising, in combination, a casing, a coil unit mounted on said casing including a paramagnetic core having a coil wound thereon, a suspended element rotatably mounted in said casing, a generally U-shaped laminated member forming a part of said element, the legs of said member defining a pair of spaced radially extending paramagnetic fingers having their end portions closely adjacent the respective ends of said core, means biasing said element to a predetermined angular position, a second coil forming a part of said element, and means for applying an alternating current to said coil thereby to establish an alternating magnetic flux linkage between said fingers and said core whereby relative angular movement between said element and said casing causes a change in said flux linkage thereby producing an electric current in said first-mentioned coil which is representative of the displacement of the armature from said predetermined angular position.

9. A rotational seismometer comprising, in combination, a casing, a plurality of coil units spaced circumferentially about said casing, each unit including a pair of opposed, generally U-shaped laminations having an air gap therebetween with a coil wound on each lamination, a suspended element, a spring suspension including two sets of flexure plate hinges mounted on said casing for biasing said element to a predetermined angular position and preventing axial or transverse displacement of said element with respect to said casing, a series of generally U-shaped laminated members spaced circumferentially about said armature, the legs of each member forming a pair of paramagnetic fingers cooperating with one of said coil units, the outer end portions of said fingers being closely adjacent the air gap of the coil unit associated therewith, a coil wound around the bases of said U-shaped members, and means for passing an alternating current through said coil to establish alternating magnetic flux linkages between each set of fingers and the laminations associated therewith whereby relative angular movement between said element and said casing causes a change in said flux linkages thereby producing an alternating electric current in each coil which is proportional to the displacement of said element from said predetermined angular position.

10. A rotational seismometer comprising, in combination, a casing having a generally cylindrical portion, a set of coil units spaced circumferentially about said cylindrical portion, each unit including a spider of non-magnetic material secured to said casing, a pair of generally U-shaped laminated cores supported by said spider and having their ends in closely spaced relation defining a small gap therebetween, and a coil wound upon each of said laminated cores, a suspended element, upper and lower end plates on said element having a plurality of sets of radial, aligned slots formed therein, a spring suspension mounting said element at the center of said cylindrical portion and biasing it to a predetermined angular position, means on said element for establishing a magnetic circuit with the cores of each coil unit including a U-shaped laminated member mounted in each set of slots in said end plates, the legs of each member defining spaced fingers extending radially from said element to the respective ends of each gap, a coil wound around the bases of all of said laminated members, and means for applying alternating current to said coil whereby displacement of said element from said predetermined angular position causes a change in the flux linkage between the outer ends of each set of fingers and the associated cores thereby producing an alternating electric current in the coils of said units which is proportional to said displacement.

RAYMOND G. PIETY.

References Cited in the file of this patent

UNITED STATES PATENTS

| Number | Name | Date |
|---|---|---|
| 1,852,232 | Buchhold | Apr. 5, 1932 |
| 2,161,256 | Karcher | June 6, 1939 |
| 2,286,386 | Silverman | June 16, 1942 |
| 2,297,251 | Schild | Sept. 29, 1942 |
| 2,390,187 | Sharpe | Dec. 4, 1945 |
| 2,390,328 | Roberts | Dec. 4, 1945 |
| 2,396,540 | Stansfield | Mar. 12, 1946 |

FOREIGN PATENTS

| Number | Country | Date |
|---|---|---|
| 514,228 | Great Britain | Nov. 2, 1939 |

OTHER REFERENCES

A Study of Some Seismometers, Irland, U. S. Bureau of Mines Technical Paper 556, p. 14, pub. 1934, by U. S. Govt. Printing Office.